Patented Dec. 10, 1940

2,224,834

UNITED STATES PATENT OFFICE 2,224,834

PREVENTING THE CAKING OF SODIUM PERBORATE

Joseph S. Reichert and Allen M. Taber, Niagara Falls, N. Y., assignors to E. I. du Pont de Nemours & Company, Wilmington, Del., a corporation of Delaware No Drawing. Application September 29, 1937, Serial No. 166,396

2 Claims. (Cl. 23—243)

This invention relates to the preparation of anti-caking mixtures of powdery materials. More particularly, it relates to the preparation of anti-caking preparations of sodium perborate.

Sodium perborate, usually sold in commerce in the form of the tetrahydrate, $NaBO_3.4H_2O$, is a fine powdery material which has a decided tendency to cake during storage. Wherever the powder is subjected to conditions of relatively high humidity, such as during storage in warm climates or during the summer season, the powder cakes to a degree which seriously interferes with its utilization. Since sodium perborate is largely used in oral and dental preparations it is essential that it remain free flowing under substantially all conditions of use. Caking and hardening during storage, possibly accompanied to some extent by loss of water, is detrimental and renders less satisfactory the ordinary sodium perborate of commerce.

We have now found that sodium perborate, particularly the tetrahydrate, $NaBO_3.4H_2O$, may be rendered free flowing under practically all conditions of storage, if there is incorporated with the perborate a small amount of anhydrous magnesium sulfate ($MgSO_4$). Amounts of anhydrous magnesium sulfate ranging from 10-30%, based on the weight of the sodium perborate stabilized against caking, will be found most suitable. It may be stated that the reduction in the tendency of the sodium perborate to cake is more or less directly proportional to the amount of magnesium sulfate added. However, we have found that amounts of anhydrous magnesium sulfate in excess of 30%, while tending to increase the degree of free flowing to a certain extent, do not add sufficiently to the anti-caking tendencies of the powder to warrant the employment of amounts of anhydrous magnesium sulfate greater than 30%.

While the use of magnesium hydroxide as an anti-caking agent for sodium perborate has been disclosed in the patent literature, we have found that anhydrous magnesium sulfate is very much more satisfactory than the hydroxide. We have observed that anhydrous magnesium sulfate is at least twice as effective as magnesium hydroxide in eliminating the tendency of the sodium perborate to cake when equal amounts of each agent up to 30% by weight, based upon the weight of the sodium perborate stabilized are present.

As an example of our novel sodium perborate stabilized against caking by the addition of anhydrous magnesium sulfate, it may be stated that a sample of sodium perborate tetrahydrate containing 20% of anhydrous magnesium sulfate was prepared. This powdery product had approximately one-half the tendency to cake that a similar sample of perborate prepared containing 20% of magnesium hydroxide possessed. Its free flowing properties were approximately ten times as great as those of sodium perborate tetrahydrate containing no anti-caking agent. The anhydrous magnesium sulfate was thoroughly and evenly dispersed throughout the powdery sodium perborate prior to testing by thorough mixing.

It is to be understood that the foregoing example is merely illustrative and by no means limits the scope of our invention. Our invention may be incorporated in various other embodiments than that disclosed as the preferred embodiment, as signified by the scope of the appended claims.

We claim:

1. A dry mixture which will not cake upon storage to any substantial extent which comprises a mixture of powdered sodium perborate tetrahydrate and anhydrous magnesium sulfate, said anhydrous magnesium sulfate being present in an amount greater than 10% by weight, based on the weight of the sodium perborate.

2. A dry mixture which is stable upon storage and which will not cake upon storage to any substantial degree which comprises a dry mixture of powdered sodium perborate tetrahydrate and from 10 to 30% by weight of anhydrous magnesium sulfate, based on the weight of the sodium perborate.

JOSEPH S. REICHERT.
ALLEN M. TABER.